US010241215B2

(12) United States Patent
Medagoda et al.

(10) Patent No.: US 10,241,215 B2
(45) Date of Patent: Mar. 26, 2019

(54) SENSOR ALIGNMENT CALIBRATION

(71) Applicant: AGJUNCTION LLC, Hiawatha, KS (US)

(72) Inventors: Eran D. B. Medagoda, Morningside (AU); Andreas F. Ramm, Woolloongabba (AU); Tri M. Dang, Durack (AU); Adam Boseley, Carindale (AU)

(73) Assignee: AGJUNCTION LLC, Hiawatha, KS (US)

( * ) Notice: Subject to any disclaimer, the term of this patent is extended or adjusted under 35 U.S.C. 154(b) by 236 days.

(21) Appl. No.: 15/350,494

(22) Filed: Nov. 14, 2016

(65) Prior Publication Data

US 2017/0146667 A1 May 25, 2017

Related U.S. Application Data

(60) Provisional application No. 62/257,395, filed on Nov. 19, 2015.

(51) Int. Cl.
*G01S 19/54* (2010.01)
*G01C 21/16* (2006.01)
*G01C 25/00* (2006.01)

(52) U.S. Cl.
CPC .............. *G01S 19/54* (2013.01); *G01C 21/16* (2013.01); *G01C 25/00* (2013.01); *G01C 25/005* (2013.01)

(58) Field of Classification Search
CPC ......... G01S 19/54; G01C 21/16; G01C 25/00; G01C 25/005
See application file for complete search history.

(56) References Cited

U.S. PATENT DOCUMENTS 4,713,697 A * 12/1987 Gotou ................ H04N 5/23248
348/208.2
5,194,851 A 3/1993 Kraning et al.
(Continued)

FOREIGN PATENT DOCUMENTS

DE 102005033237 1/2007

OTHER PUBLICATIONS

Noh, Kwang-Mo, Self-tuning controller for farm tractor guidance, Iowa State University Retrospective Theses and Dissertations, Paper 9874, (1990).

(Continued)

*Primary Examiner* — Frederick M Brushaber
(74) *Attorney, Agent, or Firm* — Schwabe Williamson & Wyatt

(57) ABSTRACT

A calibration scheme measures roll, pitch, and yaw and other speeds and accelerations during a series of vehicle maneuvers. Based on the measurements, the calibration scheme calculates inertial sensor misalignments. The calibration scheme also calculates offsets of the inertial sensors and GPS antennas from a vehicle control point. The calibration scheme can also estimate other calibration parameters, such as minimum vehicle radii and nearest orthogonal orientation. Automated sensor calibration reduces the amount of operator input used when calibrating sensor parameters. Automatic sensor calibration also allows the operator to install an electronic control unit (ECU) in any convenient orientation (roll, pitch and yaw), removing the need for the ECU to be installed in a restrictive orthogonal configuration. The calibration scheme may remove dependencies on a heading filter and steering interfaces by calculating sensor parameters based on raw sensor measurements taken during the vehicle maneuvers.

18 Claims, 10 Drawing Sheets

ORTHOGONAL ECU INSTALLATIONS

(56) References Cited

U.S. PATENT DOCUMENTS

| | | | |
|---|---|---|---|
| 5,390,125 A | 2/1995 | Sennott et al. | |
| 5,446,658 A * | 8/1995 | Pastor | B60G 17/019 701/1 |
| 5,663,879 A | 9/1997 | Trovato et al. | |
| 5,923,270 A | 7/1999 | Sampo et al. | |
| 6,052,647 A | 4/2000 | Parkinson et al. | |
| 6,070,673 A | 6/2000 | Wendte | |
| 6,212,453 B1 | 4/2001 | Kawagoe et al. | |
| 6,282,496 B1 * | 8/2001 | Chowdhary | G01C 21/165 342/357.31 |
| 6,373,432 B1 | 4/2002 | Rabinowitz et al. | |
| 6,377,889 B1 | 4/2002 | Soest | |
| 6,415,223 B1 * | 7/2002 | Lin | G01C 21/20 340/988 |
| 6,445,983 B1 | 9/2002 | Dickson et al. | |
| 6,522,992 B1 * | 2/2003 | McCall | G01C 21/16 701/4 |
| 6,539,303 B2 | 3/2003 | McClure et al. | |
| 6,711,501 B2 | 3/2004 | McClure et al. | |
| 6,714,848 B2 * | 3/2004 | Schubert | B60R 21/013 280/735 |
| 6,714,851 B2 * | 3/2004 | Hrovat | B60R 16/0233 340/440 |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,162,348 B2 | 1/2007 | McClure et al. | |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| 7,689,354 B2 | 3/2010 | Heiniger et al. | |
| 7,698,036 B2 * | 4/2010 | Watson | B60R 21/0132 280/5.506 |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,018,376 B2 | 9/2011 | McClure et al. | |
| 8,065,104 B2 | 11/2011 | Fiedler et al. | |
| 8,190,337 B2 | 5/2012 | McClure | |
| 8,214,111 B2 | 7/2012 | Heiniger et al. | |
| 8,271,175 B2 * | 9/2012 | Takenaka | B60T 8/17551 701/70 |
| 8,311,696 B2 | 11/2012 | Reeve | |
| 8,386,129 B2 | 2/2013 | Collins et al. | |
| 8,392,102 B2 * | 3/2013 | Fiedler | B60G 17/019 701/124 |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,532,899 B1 * | 9/2013 | Loomis | G01C 9/08 340/438 |
| 8,548,649 B2 | 10/2013 | Guyette et al. | |
| 8,566,034 B1 | 10/2013 | Van Wyck Loomis | |
| 8,583,312 B2 * | 11/2013 | Schreiber | B62D 15/0245 701/23 |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,589,015 B2 * | 11/2013 | Willis | G01C 21/165 701/1 |
| 8,594,879 B2 | 11/2013 | Roberge et al. | |
| 8,634,993 B2 | 1/2014 | McClure et al. | |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,255,992 B2 | 2/2016 | McClure | |
| 9,389,615 B2 | 7/2016 | Webber et al. | |
| 9,791,279 B1 * | 10/2017 | Somieski | G01C 21/165 |
| 2002/0008661 A1 * | 1/2002 | McCall | G01C 21/165 342/357.3 |
| 2002/0022924 A1 * | 2/2002 | Begin | G01C 21/16 701/408 |
| 2002/0072850 A1 | 6/2002 | McClure et al. | |
| 2002/0128795 A1 * | 9/2002 | Schiffmann | B60R 21/0132 702/151 |
| 2002/0135420 A1 * | 9/2002 | McCall | G01C 21/16 330/68 |
| 2002/0183899 A1 * | 12/2002 | Wallner | B60R 21/013 701/1 |
| 2004/0150557 A1 | 8/2004 | Ford et al. | |
| 2004/0186644 A1 | 9/2004 | McClure et al. | |
| 2006/0167600 A1 | 7/2006 | Nelson, Jr. et al. | |
| 2008/0048405 A1 * | 2/2008 | DeLorenzis | B60G 17/0432 280/6.159 |
| 2009/0025998 A1 * | 1/2009 | Brandmeier | B60R 21/0133 180/282 |
| 2009/0088974 A1 * | 4/2009 | Yasan | G01C 21/28 701/469 |
| 2010/0274452 A1 | 10/2010 | Ringwald et al. | |
| 2012/0221244 A1 | 8/2012 | Georgy et al. | |
| 2014/0266877 A1 | 9/2014 | McClure | |
| 2014/0277676 A1 | 9/2014 | Gattis | |
| 2015/0175194 A1 | 6/2015 | Gattis | |
| 2016/0039454 A1 | 2/2016 | Mortimer | |
| 2016/0040992 A1 * | 2/2016 | Palella | G01C 21/165 702/152 |
| 2016/0154108 A1 | 6/2016 | McClure et al. | |
| 2016/0205864 A1 | 7/2016 | Gattis et al. | |
| 2016/0214643 A1 | 7/2016 | Joughin et al. | |
| 2016/0252909 A1 | 9/2016 | Webber et al. | |
| 2016/0334804 A1 | 11/2016 | Webber et al. | |

OTHER PUBLICATIONS

Van Zuydam,. R.P., Centimeter-Precision Guidante of Agricultural Impleet ns in the Open Field by Means of Real Tim Kinematic DGPS, ASA-CSSA-SSSA, pp. 1023-1034 (1999).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

ORTHOGONAL ECU INSTALLATIONS

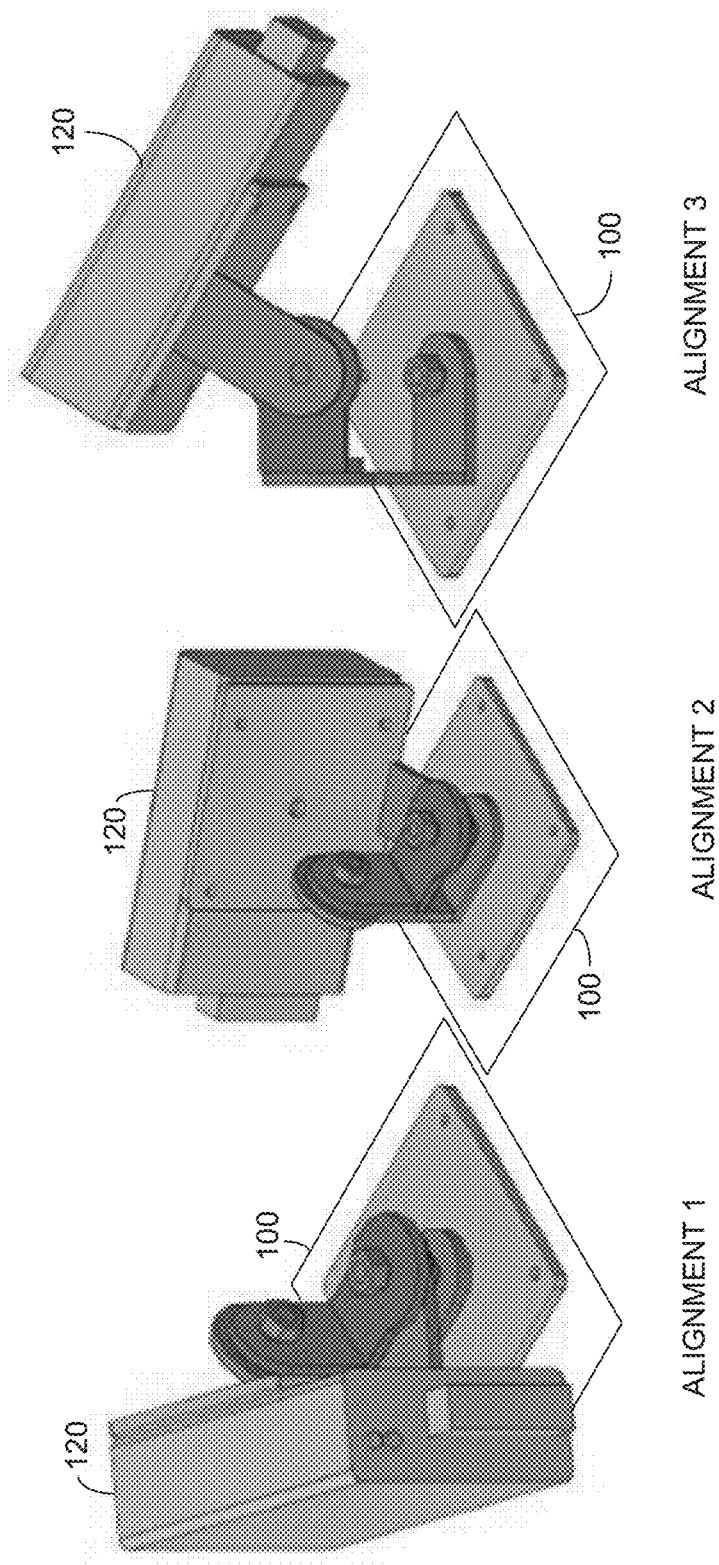

PITCH MISALIGNMENT CALCULATION

ROLL MISALIGNMENT CALCULATION

ECU INSTALLATION MISALIGNMENT CALIBRATION MANEUVERS

GPS ANTENNA OFFSET CALIBRATION MANEUVERS

SENSOR ALIGNMENT CALIBRATION

The present application claims priority to U.S. Provisional Patent Application Ser. No. 62/257,395 filed on Nov. 19, 2015, entitled: SENSOR ALIGNMENT CALIBRATION which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to sensor calibration.

BACKGROUND

Accurate and robust automated steering applications rely on accurate sensor positioning and installation. Measured vehicle position and heading is based on knowledge of the relative alignment and offset distance of the vehicle sensors from a vehicle control point. If the relative sensor distances from the control point are incorrectly measured, vehicle positions and headings based on those relative sensor distances are also incorrect.

Sensor installation parameters, such as distances and angles relative to the vehicle control point, are currently measured by the vehicle operator. Subject to the amount of care and expertise of the vehicle operator, manually measured installation parameters may include parallax errors and other types of errors that result in poor steering performance and possible vehicle instability.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 2 shows example non-orthogonal ECU installations.

DETAILED DESCRIPTION

A calibration scheme measures roll, pitch, and yaw rates and other speed and accelerations during a series of vehicle maneuvers. Based on the measurements, the calibration scheme calculates inertial sensor misalignments. The calibration scheme also calculates offsets of inertial sensors and GPS antennas from a vehicle control point. The calibration scheme can also estimate other calibration parameters, such as minimum vehicle radii and nearest orthogonal orientation.

Automated sensor calibration reduces the amount of operator input used when defining sensor installation parameters. Automated sensor calibration also allows the operator to install an electronic control unit (ECU) in any convenient orientation (roll, pitch and yaw), removing the need for the ECU to be installed in a restrictive orthogonal configuration. Automated sensor calibration may remove dependencies on a heading filter and steering interfaces by calculating sensor parameters based on raw sensor measurements taken during the vehicle maneuvers.

Figure 1:
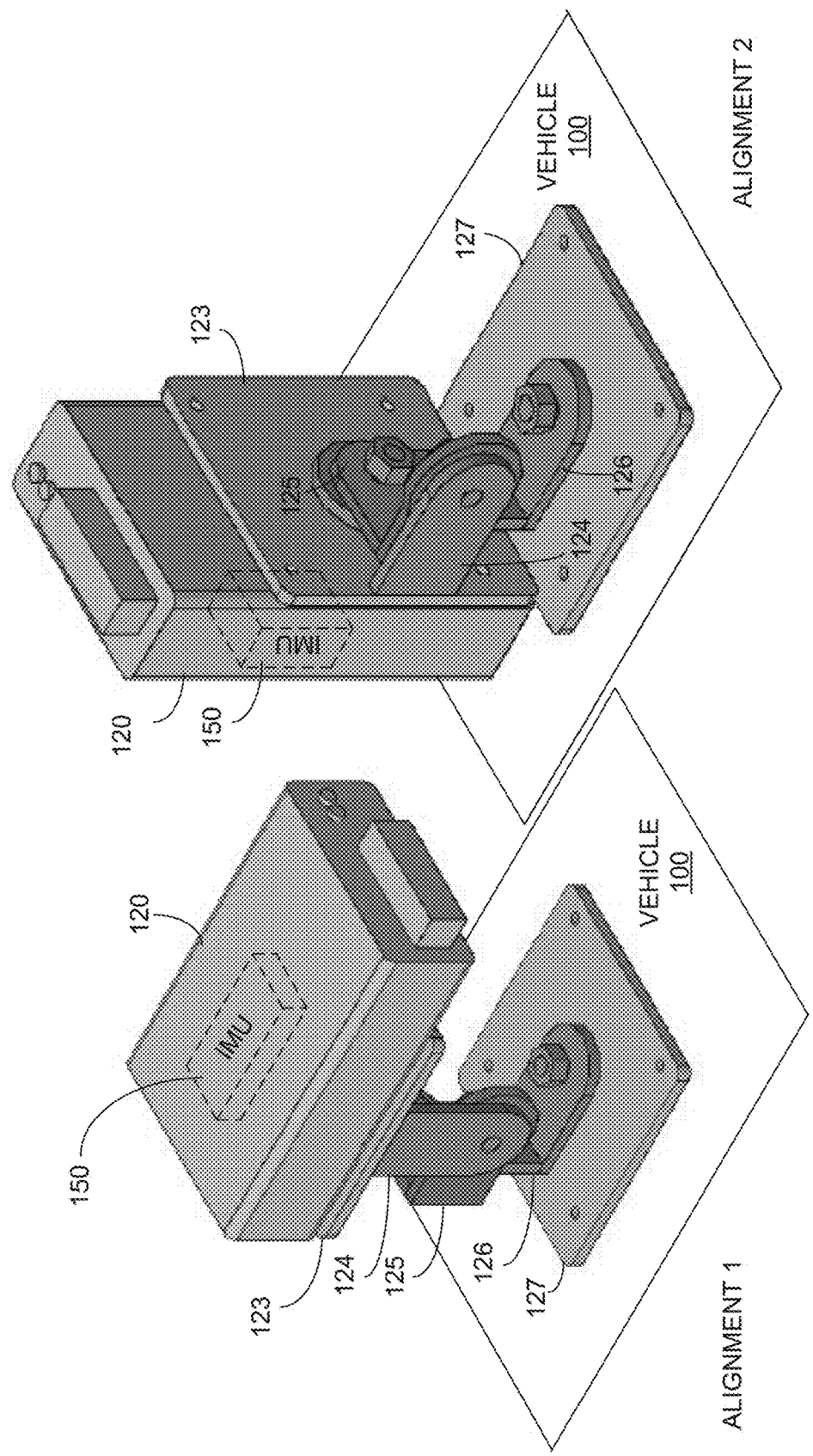
FIG. 1 shows example orthogonal electronic control unit (ECU) installations.

FIG. 1 illustrates two typical orthogonal ECU installations. In one example, ECU 120 may contain one or more inertial measurement units (IMU) 150. The IMUs 150 may include a collection of accelerometers and gyroscopes alternatively referred to as inertials used for measuring speed, acceleration, yaw, pitch, roll, or any other vehicle heading or position. ECU 120 may include other electronics and processors for recording the inertial measurements.

A plate 127 is attached to a vehicle 100 and a set of hinges 124, 125, and 126 attach plate 127 to a plate 123 attached to ECU 120. Hinges 124, 125, and 126 may rotate ECU 120 into a variety of different alignments relative to vehicle 100. In alignment 1, ECU 120 is aligned and level with attached vehicle 100. In alignment 2, ECU 120 is rotated in pitch by 90° and appears vertically aligned with vehicle 100. The orthogonal installations in FIG. 1 are indicative of current installation procedures, where ECU 120 has to be aligned parallel or perpendicularly with the vehicle axis.

A GPS antenna may be installed on the chassis of vehicle 100 and offset from ECU 120. Preferably, IMU 150 within ECU 120 is located as close as possible to a pivot point of vehicle 100. The pivot point is alternatively referred to as a vehicle control point or center of gravity. However, due to space limitations on vehicle 100, ECU 120 may be offset and/or misaligned with the control point and longitudinal/lateral axes of vehicle 100 that extend through the control point.

FIG. 2 illustrates non-orthogonal installations, where no axes of ECU 120 are aligned with axes of vehicle 100. These cases represent more general ECU installations, where there is no restriction on the alignment of ECU 120. Sensor alignment calibration as described below allows an operator to attach ECU 120 in any orientation with respect to vehicle 100 as shown in FIGS. 1 and 2 and automatically calculate the misalignments and offsets relative to the vehicle axes.

References below to a local frame may refer to a frame of reference on the ground looking north and is also referred to as a fixed frame. References to a body frame may refer to a frame of vehicle 100 as it moves and an x-axis may typically be a heading of the body frame. An ECU frame may refer to the vehicle body but relative to ECU box 120.

Calibration

Figure 3A:
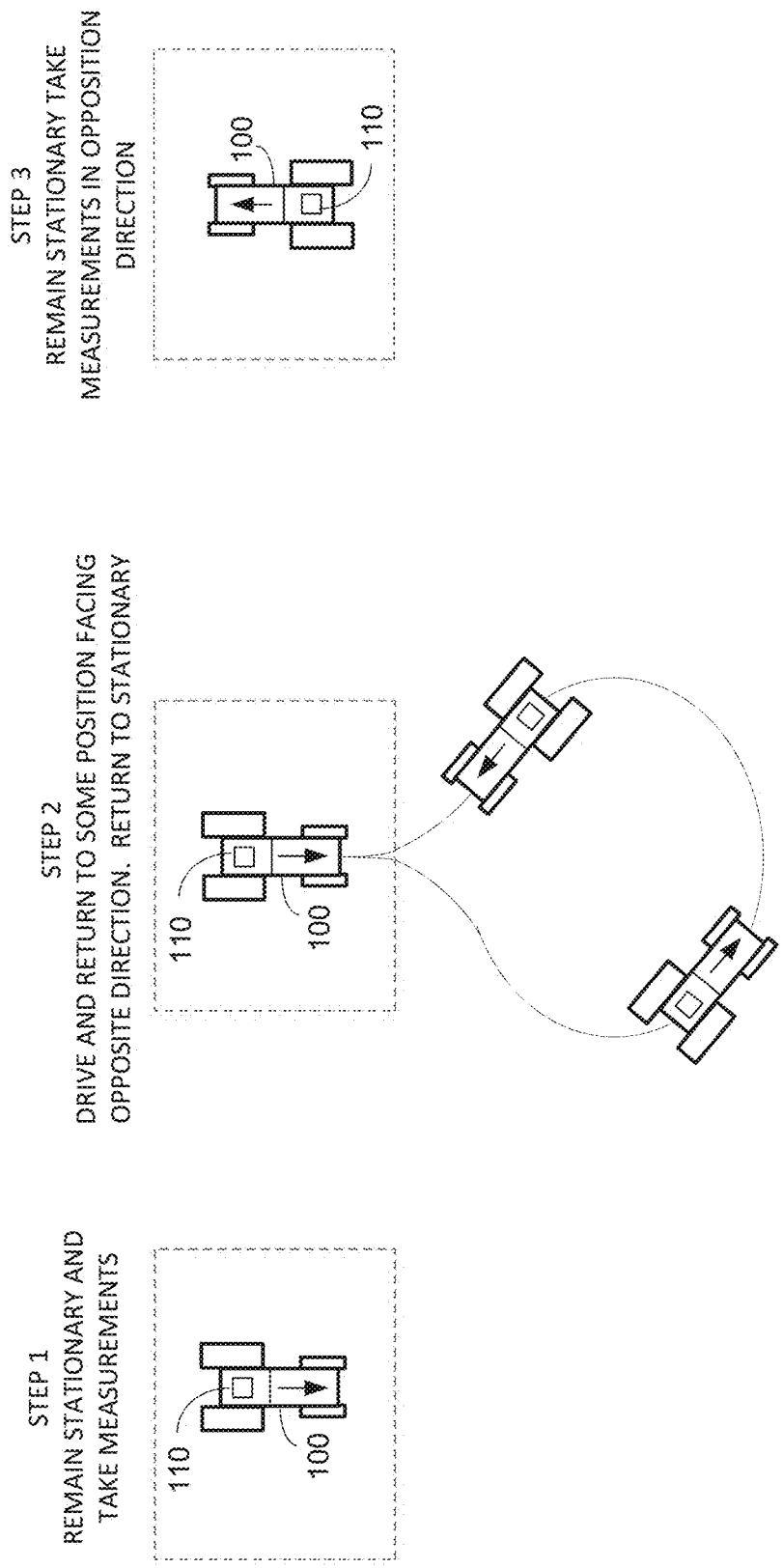
FIGS. 3A and 3B show vehicle maneuvers performed while reading vehicle sensor data.
Figure 3B:
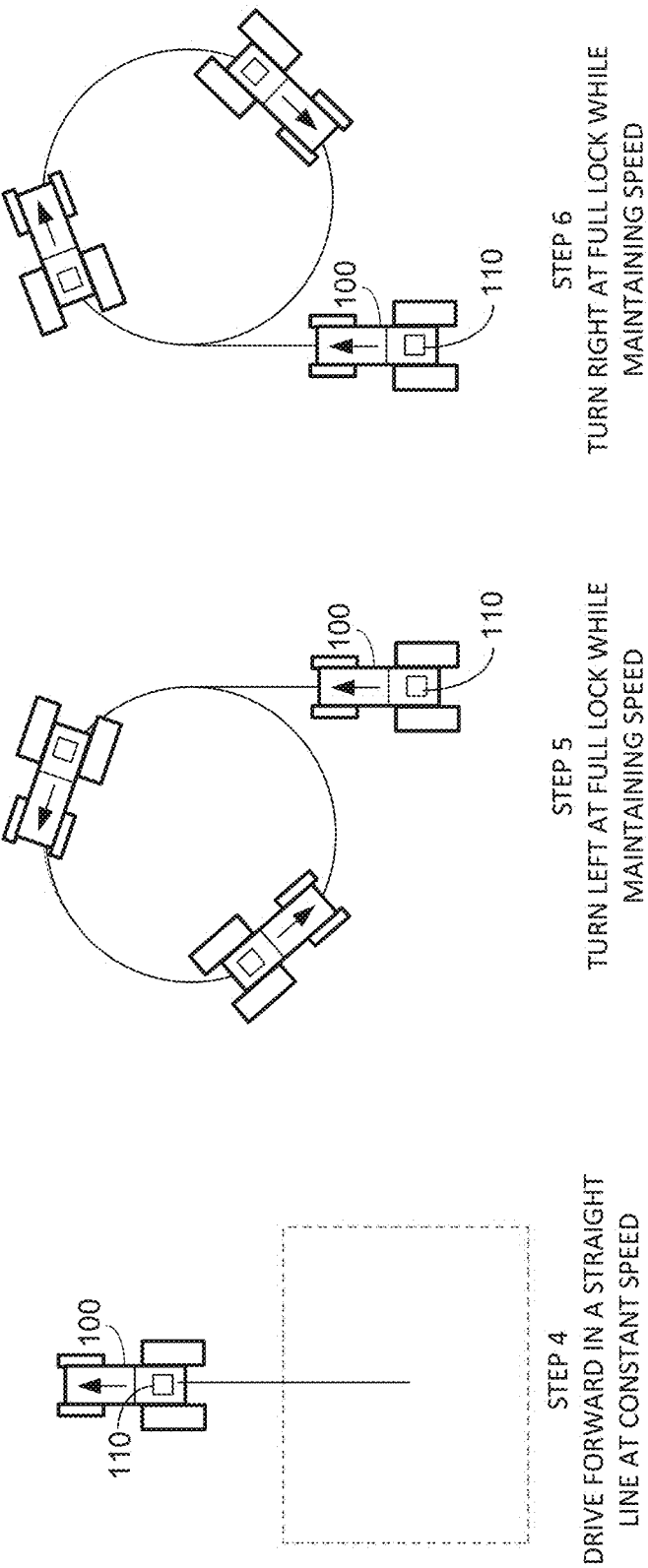

FIGS. 3A and 3B show example vehicle maneuvers performed during automated sensor alignment calibration. In one example, an operator may manually drive vehicle 100 through a series of steps 1-6 based on instructions provided via user interface prompts displayed from a screen included on a navigation system 110.

During step 1, the operator may turn on vehicle 100 and navigation system 110 but keep vehicle 100 in a stationary position. Navigation system 110 takes first sensor readings during step 1, such as vehicle acceleration readings from accelerometers in ECU 120 in FIGS. 1 and 2. During step 2, the operator may drive vehicle 100 from the current stationary location around in a circular pattern and then return to the initial location but in a 180 degree opposite direction. Navigation system 110 then takes additional sensor readings during step 2 and step 3 while vehicle 100 is in the stationary opposite 180 degree position.

Referring now to FIG. 3B, during step 4, navigation system 110 takes sensor readings while the operator drives vehicle 100 forward in a straight line at a constant speed. For example, navigation system 110 may take speed and yaw baseline readings.

During step 5, navigation system 110 takes sensor readings while the operator drives vehicle 100 in a full lock left turn while maintaining a constant speed. During step 6, navigation system 110 takes sensor readings while the operator drives vehicle 100 in a full lock right turn while maintaining a constant speed. A full lock turn refers to the vehicle operator turning the vehicle steering wheel as far as possible to the left or to the right. Sensor readings taken by navigation system 110 during steps 5 and 6, may include global positioning system (GPS) speed readings, gyroscope yaw rate readings, and accelerometer readings.

ECU Installation Misalignment

One objective of step 1 is to obtain the roll $\phi_1$ and pitch $\theta_1$ measured by IMU 150 (FIG. 1). Step 2 then obtains the roll $\phi_2$ and pitch $\theta_2$ measured by IMU 150 following the repositioning of vehicle 100 at the 180 degree heading change. Steps 1 and 2 are part of an initial calibration used to determine the roll and pitch installation misalignment of ECU 120 with the reference axis of vehicle 100. Performing these measurements in opposite vehicle directions removes terrain effects that may contribute to false roll and pitch ECU measurements.

Figure 4:
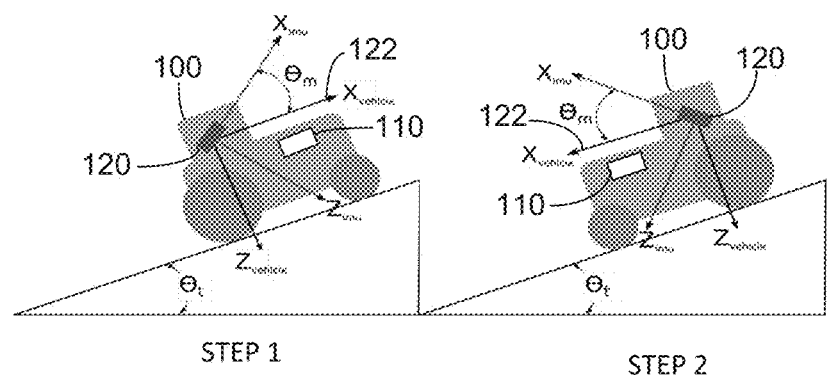
FIG. 4 shows an example process for calculating sensor pitch misalignment.

FIG. 4 illustrates the principles behind steps 1 and 2 in more detail. In step 1, vehicle 100 is stationary, facing up on a sloped surface, with a terrain pitch of $\theta_t$. ECU 120 was installed with an installation misalignment of $\theta_m$ relative to a body axis 122 ($X_{vehicle}$, $Y_{vehicle}$) of vehicle 100. The roll and pitch values calculated in steps 1 and 2 are derived by comparing acceleration components measured by the IMU accelerometers within ECU 120 relative to a gravity vector. When sensor measurements are taken during step 1, the measured pitch may be a combination of both the terrain and IMU misalignment pitch angles, where:

$$\theta_1 = \theta_t + \theta_m \quad (2.1)$$

In step 2, vehicle 100 has changed direction relative to the terrain, facing down the slope, but misalignment angle $\theta_m$ of ECU 120 relative to body axis 122 remains the same. Therefore, the measured pitch angle during step 2 is:

$$\theta_2 = -\theta_t + \theta_m \quad (2.2)$$

With this information, navigation system 110 may calculate the ECU pitch misalignment $\theta_m$ by averaging the pitch estimates obtained in steps 1 and 2, where:

$$\theta_m = \frac{\theta_1 + \theta_2}{2} \quad (2.3)$$

Operation 2.3 eliminates the terrain pitch effects, so only the pitch installation misalignment angle $\theta_m$ for ECU 120 remains.

Figure 5:
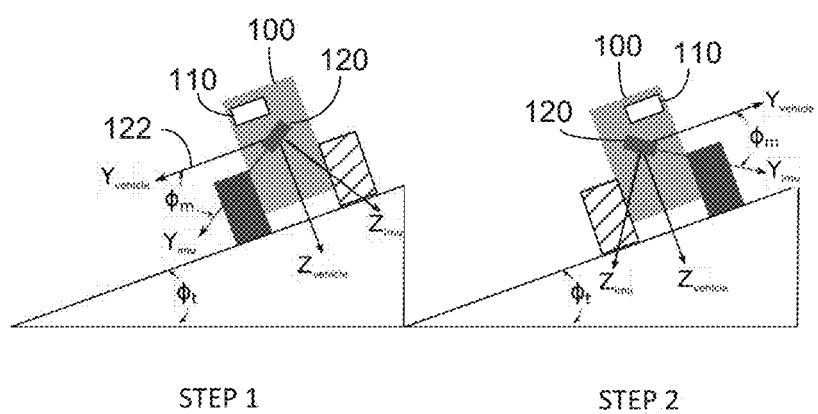
FIG. 5 shows an example process for calculating sensor roll misalignment.

FIG. 5 shows how navigation system 110 calculates the roll misalignment angle $\phi_m$. By measuring vehicle roll in opposite directions, the terrain effects on roll can be eliminated, where:

$$\phi_1 = \phi_t + \phi_m \quad (2.4)$$

$$\phi_2 = -\phi_t + \phi_m \quad (2.5)$$

$$\phi_m = \frac{\phi_1 + \phi_2}{2} \quad (2.6)$$

With the roll and pitch misalignments calculated, navigation system 110 performs an intermediate frame transformation to align the measurements from IMU 150 with a local-level frame. As mentioned above, the local frame is the frame of reference on the ground or fixed frame often with a reference to north. An intermediate frame transformation can be expressed as:

$$C_b^L = L_y(-\theta_m)L_r(-\phi_m) \quad (2.7)$$

where $C_b^L$ describes the transformation from the sensor (body) frame to the local-level frame. The matrices $L_x$ and $L_y$ refer to rotations in the x and y axes respectively.

The frame transformation in process 2.7 may align the IMU sensor readings with expected vehicle axes. For example, if IMU 150 pitches up and is rolled to the right, process 2.7 may unroll and depitch the measurements to align with vehicle axes that extend through the vehicle control point and effectively algorithmically straightens out IMU 150.

Navigation system 110 uses step 3 in FIG. 3A to estimate yaw rate bias $\dot{\psi}_b$, which is used to de-bias yaw rate measurements during subsequent vehicle maneuvers. A yaw rate de-bias is then performed so subsequent calculations are not effected by drifting yaw rate measurements that can be common to inertial sensors. Navigation system 110 may achieve greater steering accuracy by estimating and eliminating yaw rate bias from navigation measurements.

Navigation system 110 uses step 4 to determine the calibration speed $V_0$, maintained throughout the calibration process. In one example, calibration speed $V_0$ is selected to be as high as possible without the vehicle wheels slipping on the terrain. The same calibration speed may be used throughout the other vehicle maneuvers in steps 5 and 6.

Figure 6:
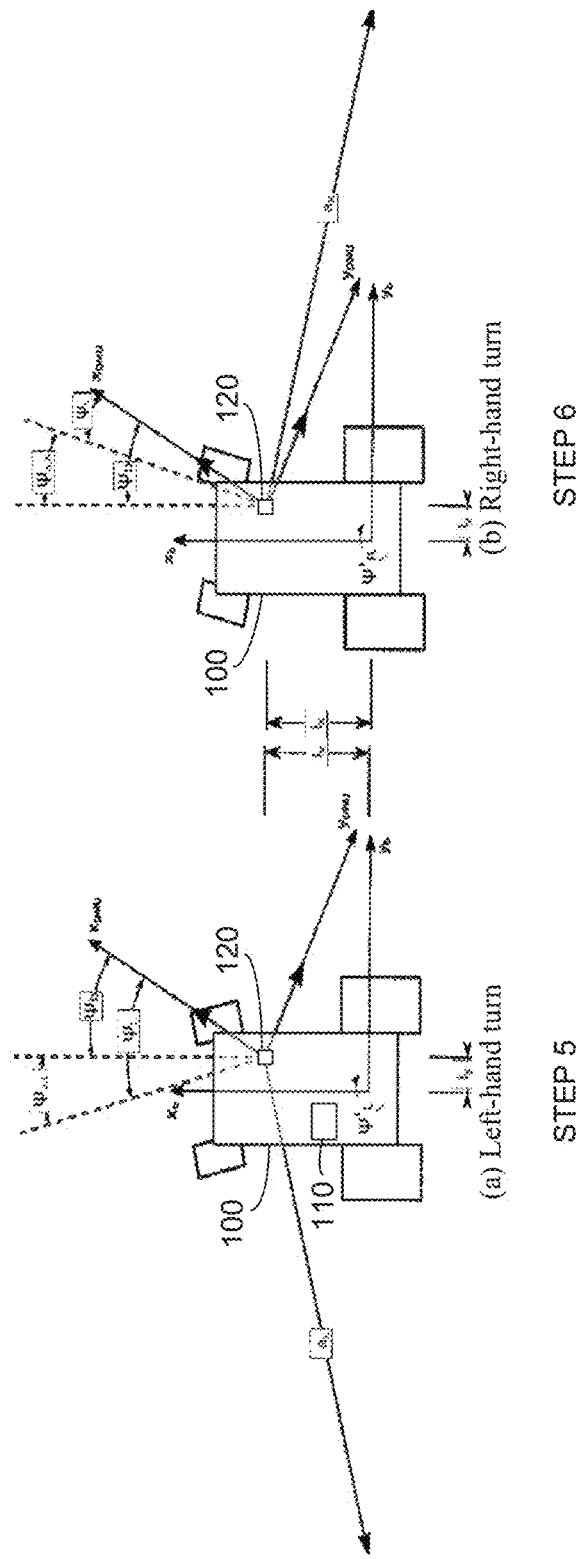
FIG. 6 shows an example process for calculating inertial sensor offsets and yaw misalignment.

FIG. 6 illustrates how ECU misalignment estimation is performed in steps 5 and 6 of FIG. 3B. Navigation system 110 uses step 5 to determine the IMU velocity $V_{IMU,L}$ and yaw rate $\dot{\psi}_L$ for a left-hand vehicle turn. This is performed by steering vehicle 100 to full-lock left (the maximum amount vehicle 100 can turn left) and recording the measured data from ECU 120.

Similarly, navigation system 110 uses step 6 in FIG. 3B to determine the IMU velocity $V_{IMU,R}$ and yaw rate $\dot{\psi}_R$ for the right-hand turn at full-lock right. Left and right hand turning maneuvers are used since the installation location of ECU 120 can be off-center and turning in both left and right directions allows navigation system 110 to compensate for the effects of an off-center installation of ECU 120. At the completion of step 6, navigation system 110 has collected all sensor data needed for calculating installation misalignment and offset values for ECU 120 and a GPS antenna.

In one example, the velocities from IMU 150 within ECU 120 cannot be measured directly, and are estimated using corrected accelerations that have been transformed into the local-level frame. Again, IMU 150 may include any combination of gyroscopes and accelerometers that measure yaw, pitch and roll rates, speed, acceleration, etc. Navigation system 110 uses the corrected accelerations to calculate the IMU velocities as follows:

$$V_{IMU,L} = \frac{\sqrt{a_{\hat{x},L2} + a_{\hat{y},L2}}}{\dot{\psi}_L - \dot{\psi}_b} \quad (2.8)$$

$$V_{IMU,R} = \frac{\sqrt{a_{\hat{x},R2} + a_{\hat{y},R2}}}{\dot{\psi}_R - \dot{\psi}_b} \quad (2.9)$$

where $a_{\hat{x},L}$, $a_{\hat{y},L}$ and $a_{\hat{x},R}$, $a_{\hat{x},R}$ are the corrected accelerations measured in the x and y axis accelerometers for each turn direction obtained during steps 5 and 6.

With these measured values, navigation system 110 determines the forward IMU offset $l_x$ and lateral IMU offset $l_y$ as follows:

$$l_y = \frac{n_R - n_L - \left(\frac{m_R - m_L}{n_R + n_L}\right)}{2} \quad (2.10)$$

$$l_x = \sqrt{m_R - (n_R - l_y)^2} \quad (2.11)$$

where $$m_R = \left(\frac{V_{IMU,R}}{\dot{\psi}_R - \dot{\psi}_b}\right)^2 \quad (2.12)$$

$$m_L = \left(\frac{V_{IMU,L}}{\dot{\psi}_L - \dot{\psi}_b}\right)^2 \quad (2.13)$$

and                                                                     (2.14)

$$n_R = \left|\frac{V_0}{\dot{\psi}_R - \dot{\psi}_b}\right| \quad (2.15)$$

$$n_L = \left|\frac{V_0}{\dot{\psi}_L - \dot{\psi}_b}\right| \quad (2.16)$$

Note that Equations 2.10 and 2.11 are functions of estimated values obtained during the calibration process, namely accelerations and yaw rates.

Navigation system 110 estimates the ECU yaw misalignment $\psi_m$ following the calculation of the IMU offsets relative to the vehicle control point. The yaw misalignment can be expressed as:

$$\psi_m = \frac{\psi_{m,L} + \psi_{m,R}}{2} \quad (2.17)$$

where:

$$\psi_{m,L} = \hat{\psi}_L + \psi_{a,L} \quad (2.18)$$

$$\psi_{m,R} = \hat{\psi}_L + \psi_{a,R} \quad (2.19)$$

(2.20)

-continued $$\hat{\psi}_L = \tan^{-1}\left(\frac{a_{\hat{x},L}}{a_{\hat{y},L}}\right) \quad (2.21)$$

$$\hat{\psi}_R = \tan^{-1}\left(\frac{a_{\hat{x},R}}{a_{\hat{y},R}}\right) \quad (2.22)$$

$$\psi_{a,L} = \tan^{-1}\left(\frac{l_x}{\frac{V_0}{\dot{\psi}_L} + l_y}\right) \quad (2.23)$$

$$\psi_{a,R} = \tan^{-1}\left(\frac{l_x}{\frac{V_0}{\dot{\psi}_R} - l_y}\right) \quad (2.24)$$

In a similar manner to the calculation of the pitch and roll misalignment angles calculated in Equations 2.3 and 2.6, the calculation of yaw misalignment in Equation 2.17 is an averaging process between the left and right hand turn maneuvers. This is to eliminate any effects of an off-center ECU installation.

Figure 7:
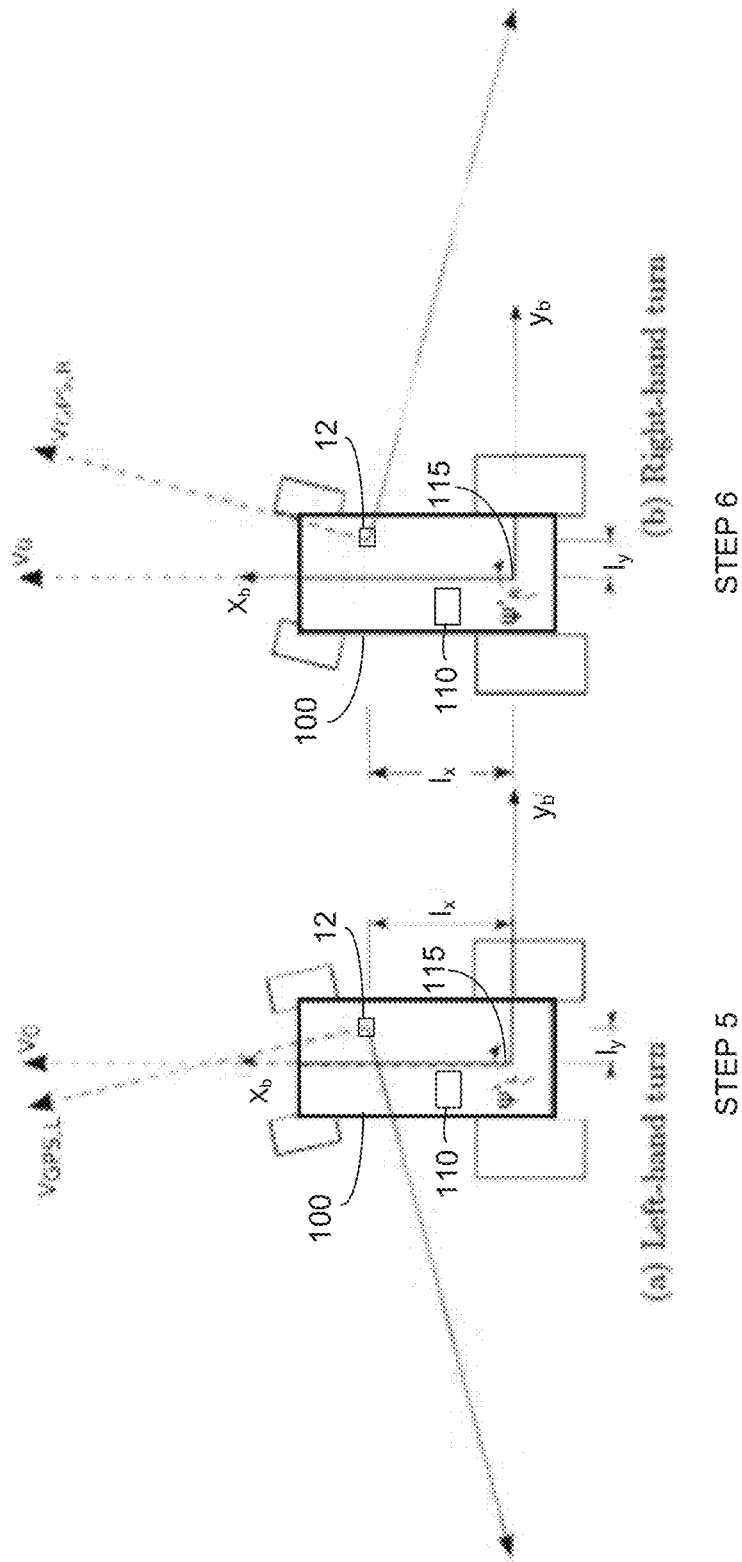
FIG. 7 shows an example process for calculating GPS antenna offsets.

FIG. 7 illustrates the process for estimating the offset of GPS antenna 12 during steps 4-6 discussed above in FIG. 3B. The GPS antenna offset calculation is similar to the ECU offset calculation but may not calculate antenna pitch and roll. Again a GPS antenna offset from vehicle control point 115 may produce different velocity readings when the vehicle turns to the left and right. Thus, navigation system 110 electronically corrects/calibrates GPS readings to the control point axes of vehicle 100.

Navigation system 110 during step 4 determines the calibration speed $V_0$, which is maintained throughout the calibration process. Navigation system 110 during step 5 measures the GPS velocity $V_{GPS,L}$ and yaw rate $\dot{\psi}_L$ during the left-hand turn. Similarly, navigation system 100 during step 6 measures the GPS velocity $V_{GPS,R}$ and yaw rate $\dot{\psi}_R$ for the right-hand turn. The values for $V_0$, $V_{GPS,L}$, $V_{GPS,R}$, $\dot{\psi}_L$, and $\dot{\psi}_R$ are measured and stored within ECU 120 or navigation system 110 as they are collected during steps 1-6.

Navigation system 110 uses the measured values to determine the longitudinal antenna offset $l_x$ and lateral antenna offset $l_y$ as follows:

$$l_y = \frac{n_R - n_L - \left(\frac{m_R - m_L}{n_R + n_L}\right)}{2} \quad (2.25)$$

$$l_x = \sqrt{m_R - (n_R - l_y)^2} \quad (2.26)$$

where:

$$m_R = \left(\frac{V_{GPS,R}}{\dot{\psi}_R - \dot{\psi}_b}\right)^2 \quad (2.27)$$

$$m_L = \left(\frac{V_{GPS,L}}{\dot{\psi}_L - \dot{\psi}_b}\right)^2 \quad (2.28)$$

(2.29)

$$|n_R = \left|\frac{V_0}{\dot{\psi}_R - \dot{\psi}_b}\right| \quad (2.30)$$

$$n_L = \left|\frac{V_0}{\dot{\psi}_L - \dot{\psi}_b}\right| \quad (2.31)$$

Note that the antenna offset estimation may be more effective when GPS antenna 12 is installed ahead of control point 115 on vehicle 100, i.e. $l_x > 0$.

Minimum Radii

Navigation system 110 may calculate the left and right minimum radii for vehicle 100 using the GPS speed and yaw rates measured during each turn direction. The left and right minimum radii can be expressed as:

$$R_{L,min} = \frac{V_{GPS,L}}{\dot{\psi}_L - \dot{\psi}_b} - l_y \qquad (2.32)$$

$$R_{R,min} = \frac{V_{GPS,R}}{\dot{\psi}_R - \dot{\psi}_b} + l_y \qquad (2.33)$$

Installation Attitude Biases

In adhering to the current definition of roll and pitch bias, the bias angles are represented relative to the nearest orthogonal installation. This rotation can expressed as follows:

$$C_{orth}^{ECU} = C_b^{ECU} C_{orth}^b \qquad (2.34)$$

Where $C_{orth}^{ECU}$ is the transformation from the nearest orthogonal alignment to the ECU frame, $C_{|orth}^{ECU}$ is the transformation from the body frame to the ECU frame (known) and $C_{orth}^b$ is the transformation from the nearest orthogonal installation to the body frame (known). An orthogonal alignment is one that has 90° rotations between axes.

Extraction of the angles from $C_{orth}^{ECU}$ yields the roll $\phi_b$, pitch $\theta_b$ and yaw bias angles $\psi_b$ relative to the nearest orthogonal installation in the ECU frame. To represent the bias angles in the body frame, the following rotation is applied:

$$\begin{bmatrix} \phi_b \\ \theta_b \\ \psi_b \end{bmatrix}_b = C_{orth}^b \begin{bmatrix} \phi_b \\ \theta_b \\ \psi_b \end{bmatrix}_{ECU} \qquad (2.35)$$

Figure 8:
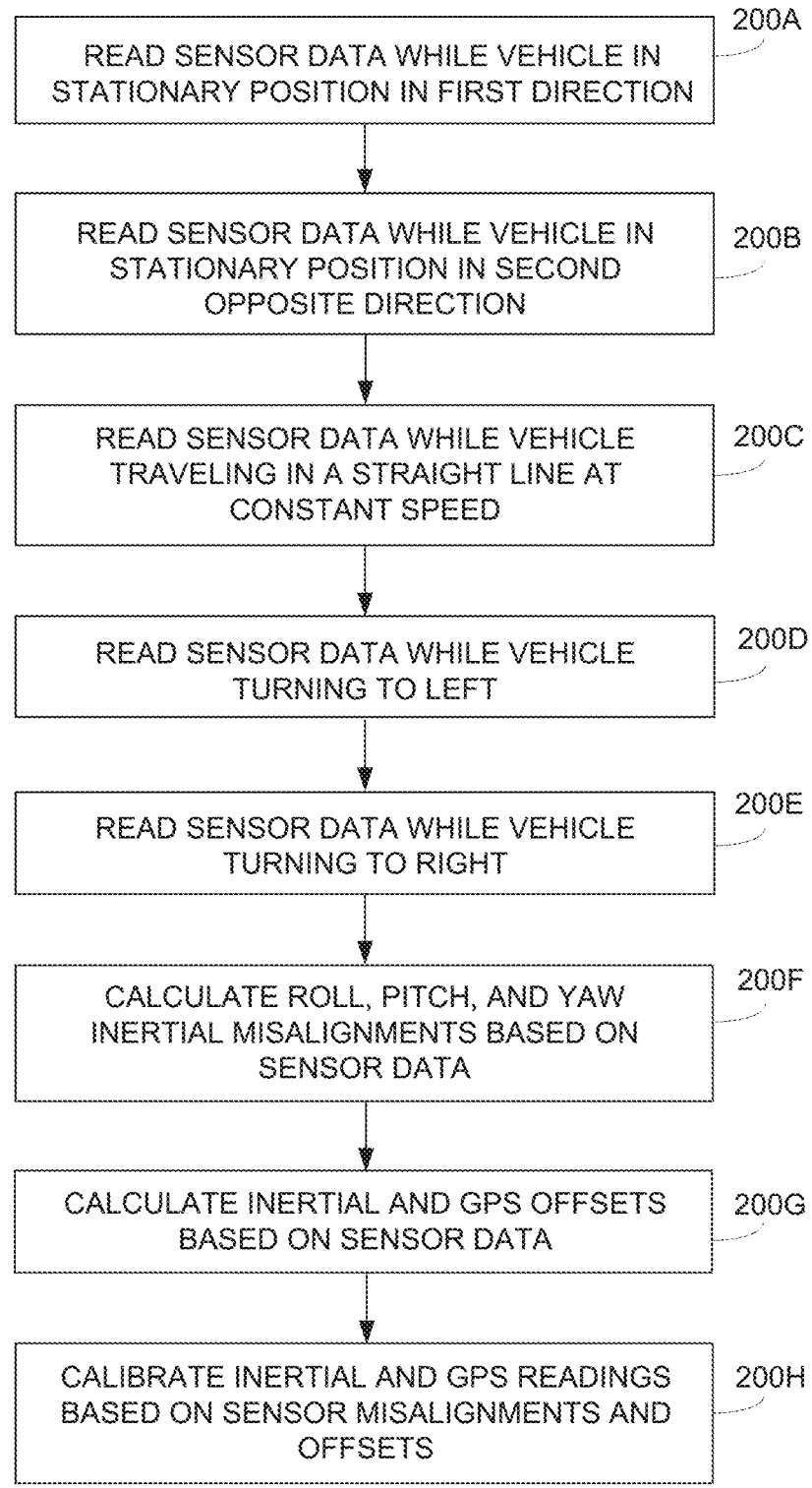
FIG. 8 shows an example process for automatically calibrating vehicle sensors.

FIG. 8 shows an example process for automatic sensor calibration. In operation 200A, the navigation system reads sensor data while the vehicle is in a stationary position and oriented in a first direction. In operation 200B, the navigation system reads the sensor data while the vehicle is in a stationary position and oriented in the opposite direction.

In operation 200C, the navigation system reads sensor data while the vehicle is traveling in a straight line at a constant speed. In operation 200D, the navigation system reads vehicle sensor data while the vehicle is turning locked to the left and in operation 200E, the navigation system reads vehicle sensor data while the vehicle is turning locked to the right.

In operation 200F, the navigation system calculates the roll, pitch, yaw and misalignments of the ECU based on the measured vehicle sensor data. For example, the navigation system calculates the roll and pitch misalignments based on the average roll and pitch readings from operations 200A and 200B. The navigation system calculates yaw misalignment based on vehicle speed, acceleration and yaw rate measurements made during operations 200C, 200D, and 200E.

In operation 200G, the navigation system calculates offsets of the ECU and GPS antenna based on the vehicle speed, acceleration and yaw rate measurements made during operations 200C, 200D, and 200E. For example, the navigation system calculates the lateral and longitudinal distances of the inertial sensors and GPS antenna from the vehicle control point. In operation 200H, the navigation system calibrates the sensors by adjusting sensor readings to the vehicle frame axes or local axes based on the derived misalignments and offsets.

Computer, Software, and Sensor Systems

A Global navigation satellite system (GNSS) is broadly defined to include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

IMUs may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Said terminology will include the words specifically mentioned, derivative thereof and words of similar meaning.

Figure 9:
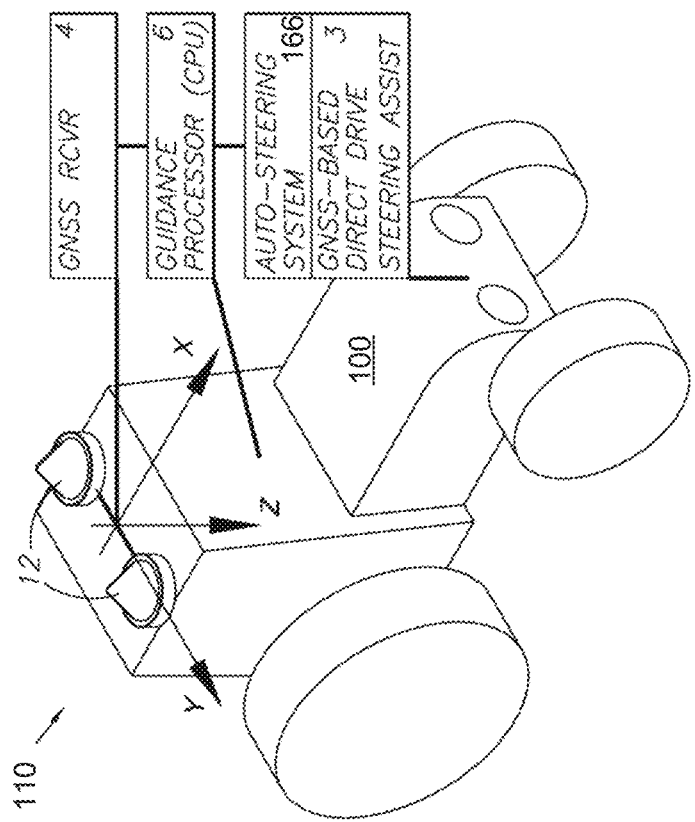
FIG. 9 shows an example guidance system for calibrating vehicle sensors.

FIG. 9 generally shows guidance system 110 used in conjunction with an electrical direct-drive steering assistance mechanism 3. Without limitation on the generality of useful applications of guidance system 110, a GNSS receiver 4, and a guidance processor 6 are connected to a GNSS antenna 12 and installed into vehicle 100, such as an agricultural vehicle or tractor. An auto-steering system 166 is electrically connected to guidance processor 6, and is mechanically interfaced with vehicle 100 via steering assistance mechanism 3.

Figure 10:
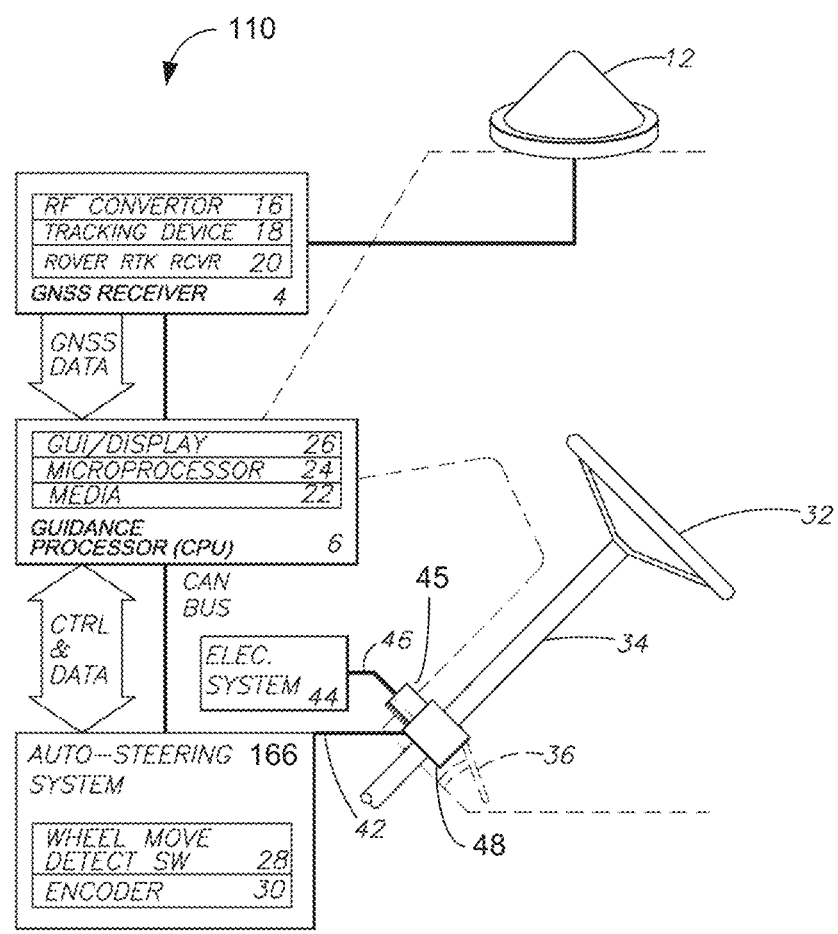
FIG. 10 shows the guidance system controlling an auto-steering system.

FIG. 10 shows additional detail of guidance system 110. The GNSS receiver 4 is further comprised of an RF convertor (i.e., downconvertor) 16, a tracking device 18, and a rover RTK receiver element 20. The receiver electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 166. Auto-steering system 166 includes a wheel movement detection switch 28 and an encoder 30 for interpreting guidance and steering commands from CPU 6.

Auto-steering system 166 may interface mechanically with the vehicle's steering column 34, which is mechanically attached to steering wheel 32. A control line 42 may transmit guidance data from the CPU 6 to the auto-steering system 166. An electrical subsystem 44, which powers the electrical needs of vehicle 100, may interface directly with auto-steering system 166 through a power cable 46. The auto-steering subsystem 166 can be mounted to steering column 34 near the floor of the vehicle, and in proximity to the vehicle's control pedals 36. Alternatively, auto-steering system 166 can be mounted at other locations along steering column 34.

The auto-steering system 166 physically drives and steers vehicle 100 or 110 by actively turning the steering wheel 32 via steering column 34. A motor 45 powered by vehicle electrical subsystem 44 may power a worm drive which powers a worm gear 48 affixed to auto-steering system 166. These components are preferably enclosed in an enclosure. In other embodiments, auto-steering system 166 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in guidance system 120 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A system for calibrating sensor readings, comprising:
a hardware processor to:
identify a vehicle control point for a vehicle, wherein the vehicle control point is a measured center of gravity of the vehicle;
read first sensor data from sensors located on the vehicle, the vehicle at a first stationary position and location;
read second sensor data from the sensors at substantially the same location and at a second opposite vehicle position;
estimate a first pitch angle of the vehicle from the first sensor data;
estimate a second pitch angle of the vehicle from the second sensor data;
calculate a pitch misalignment of the sensors relative to the vehicle control point by averaging the first and second estimated pitch angles;
estimate a first roll angle of the vehicle from the first sensor data;
estimate a second roll angle of the vehicle from the second sensor data;
calculate a roll misalignment of the sensors relative to a vehicle control point by averaging the first and second estimated roll angles; and
calibrate the sensors based on the pitch misalignment and the roll misalignment.

2. The system of claim 1, the hardware processor further to:
read third sensor data while the vehicle travels in a straight line at a constant speed;
read fourth sensor data while the vehicle turns to the left;
read fifth sensor data while the vehicle turns to the right; and
calculate offsets of the sensors from the lateral and longitudinal axes of the control point based on a yaw bias rate, and the third, fourth, and fifth sensor data.

3. The system of claim 2, the hardware processor further to calculate a yaw misalignment of the sensors relative to the control point based on the yaw bias rate and the third, fourth, and fifth sensor data.

4. The system of claim 2, the hardware processor further to:
identify left turn acceleration and yaw rate values from the fourth sensor data;
identify right turn acceleration and yaw rate values from the fifth sensor data; and
calculate the offsets of the sensors based on the left turn and right turn acceleration and yaw rate values.

5. The system of claim 2, the hardware processor further to calculate the offsets for an inertial measurement unit (IMU) on the vehicle according to:

$$l_y = \frac{n_R - n_L - \left(\frac{m_R - m_L}{n_R + n_L}\right)}{2};$$

$$l_x = \sqrt{m_R - (n_R - l_y)^2};$$

wherein:
$l_x$ is a forward offset of the IMU from the control point;
$l_y$ is a lateral offset of the IMU from the control point;

$$m_R = \left(\frac{V_{IMU,R}}{\psi_R - \psi_b}\right)^2;$$

$$m_L = \left(\frac{V_{IMU,L}}{\psi_L - \psi_b}\right)^2;$$

$$n_R = \left|\frac{V_0}{\psi_R - \psi_b}\right|;$$

-continued $$n_L = \left|\frac{V_0}{\dot{\psi}_L - \dot{\psi}_b}\right|;$$

$$V_{IMU,L} = \frac{\sqrt{a_{\hat{x},L}^2 + a_{\hat{y},L}^2}}{\dot{\psi}_L - \dot{\psi}_b};$$

$$V_{IMU,R} = \frac{\sqrt{a_{\hat{x},R}^2 + a_{\hat{y},R}^2}}{\dot{\psi}_R - \dot{\psi}_b};$$

$a_{\hat{x}L}$, $a_{\hat{y}L}$ and $a_{\hat{x}R}$, $a_{\hat{x}R}$ are corrected accelerations measured by x and y axis accelerometers for a left turn of the vehicle and a right turn of the vehicle, respectively;
$\dot{\psi}$L is a yaw rate for the left-hand turn of the vehicle;
$\dot{\psi}$R is a yaw rate the right-hand turn of the vehicle;
$\dot{\psi}$b is a yaw rate bias; and
$V_0$ is a calibration speed of the vehicle.

6. The system of claim 5, the hardware processor further to calculate a yaw misalignment $\psi_m$ of the sensors, wherein:

$$\psi_m = \frac{\psi_{m,L} + \psi_{m,R}}{2};$$

$$\psi_{m,L} = \hat{\psi}_L + \psi_{a,L};$$

$$\psi_{m,R} = \hat{\psi}_L + \psi_{a,R};$$

$$\hat{\psi}_L = \tan^{-1}\left(\frac{a_{\hat{x},L}}{a_{\hat{y},L}}\right);$$

$$\hat{\psi}_R = \tan^{-1}\left(\frac{a_{\hat{x},R}}{a_{\hat{y},R}}\right);$$

$$\psi_{a,L} - \tan^{-1}\left(\frac{l_x}{\frac{V_0}{\dot{\psi}_L} + l_y}\right); \text{ and}$$

$$\psi_{a,R} - \tan^{-1}\left(\frac{l_x}{\frac{V_0}{\dot{\psi}_R} - l_y}\right).$$

7. The system of claim 2, the hardware processor further to calculate a global positioning system (GPS) antenna offset according to:

$$l_y = \frac{n_R - n_L - \left(\frac{m_R - m_L}{n_R + n_L}\right)}{2};$$

$$l_x = \sqrt{m_R - (n_R - l_y)^2};$$

wherein:

$$m_R = \left(\frac{V_{GPS,R}}{\dot{\psi}_R - \dot{\psi}_b}\right)^2;$$

$$m_L = \left(\frac{V_{GPS,L}}{\dot{\psi}_L - \dot{\psi}_b}\right)^2;$$

$$n_R = \left|\frac{V_0}{\dot{\psi}_R - \dot{\psi}_b}\right|;$$

$$n_L = \left|\frac{V_0}{\dot{\psi}_L - \dot{\psi}_b}\right|;$$

$l_x$ is a longitudinal GPS antenna offset from the vehicle control point;
$l_y$ is a lateral GPS antenna offset from the vehicle control point;
$V_0$ is a calibration speed of the vehicle;
$V_{GPS,L}$ is a measured GPS velocity during a left hand vehicle turn;
$\dot{\psi}_L$ is a measured yaw rate during the left-hand vehicle turn;
$V_{GPS,R}$ is a measured GPS velocity during a right-hand vehicle turn;
$\dot{\psi}_R$ is a measured yaw rate during the right-hand vehicle turn; and
$\dot{\psi}_b$ is a yaw rate bias.

8. A computer system for calibrating sensors in a vehicle, the computer system comprising:
a processor; and
memory coupled to the processor and storing a set of instructions that, when executed by the processor are operable to:
measure a calibration speed $V_0$ of the vehicle while traveling at a constant speed in a straight line;
measure a yaw rate bias $\dot{\psi}_b$ of the vehicle while stationary;
measure a left yaw rate $\dot{\psi}_L$ during a left-hand turn of the vehicle;
measure a right yaw rate $\dot{\psi}_R$ during a right-hand turn of the vehicle;
calculate a misalignment of the sensors relative to a lateral and longitudinal vehicle axes based on the calibration speed $V_0$, left yaw rate $\dot{\psi}_L$, right yaw rate $\dot{\psi}_R$ and yaw rate bias $\dot{\psi}_b$ of the vehicle; and
calibrate the sensors based on the misalignment of the sensors relative to the lateral and longitudinal vehicle axes.

9. The computer system of claim 8, wherein the misalignment of the sensors is a yaw misalignment.

10. The computer system of claim 8, the set of instructions when executed by the processor are further operable to calculate an offset of the sensors from the lateral and longitudinal vehicle axes based on the calibration speed $V_0$, left yaw rate $\dot{\psi}_L$ right yaw rate $\dot{\psi}_R$ and yaw rate bias $\dot{\psi}_b$ of the vehicle.

11. The computer system of claim 8, wherein the sensors are located in an inertial measurement unit (IMU) and the set of instructions when executed by the processor are operable to calculate a misalignment and offset of the IMU relative to the lateral and longitudinal vehicle axes.

12. The computer system of claim 8, wherein the sensors include a global positioning system (GPS) antenna and the set of instructions when executed by the processor are operable to calculate an offset of the GPS antenna relative to the lateral and longitudinal vehicle axes.

13. The computer system of claim 8, wherein the instructions when executed by the processor are further operable to:
measure a first pitch angle $\theta_1$ of the vehicle at a location when pointed in a first direction;
measure a second pitch angle $\theta_2$ of the vehicle at substantially the same location when pointed in a second opposite direction; and
calculate a pitch misalignment of the sensors based on the first pitch angle $\theta_1$ and the second pitch angle $\theta_2$.

14. The computer system of claim 8, wherein the instructions when executed by the processor are further operable to:
measure a first roll angle $\phi_1$ of the vehicle at a location when pointed in a first direction;
measure a second roll angle $\phi_2$ of the vehicle at substantially the same location when pointed in a second opposite direction; and calculate a roll misalignment of the sensors based on the first roll angle $\phi_1$ and the second roll angle $\phi_2$.

15. The computer system of claim 8, wherein the instructions when executed by the processor are further operable to:
measure left turn acceleration values for the vehicle;
measure right turn acceleration values for the vehicle; and
calculate the misalignment of the sensors based on the left turn acceleration values and the right turn acceleration values.

16. A method for calibrating sensor readings, comprising:
reading first sensor data from sensors located on a vehicle at a location and first stationary vehicle position;
reading second sensor data from the sensors at substantially the same location and a second opposite stationary vehicle position;
reading third sensor data while the vehicle travels in a straight line at a constant speed;
reading fourth sensor data while the vehicle turns to the left;
reading fifth sensor data while the vehicle turns to the right;
calculating misalignments and offsets of the sensors based on the sensor data; and
calibrate the sensors based on the misalignments and offsets of the sensors.

17. The method of claim 16, further comprising:
reading a first pitch angle and first roll angle of the vehicle from the first sensor data;
reading a second pitch angle and first roll angle of the vehicle from the second sensor data;
calculating a pitch misalignment for the sensors based on the first and second pitch angle; and
calculating a roll misalignment for the sensors based on the first and second roll angle.

18. The method of claim 16, further comprising:
reading a vehicle speed from the third sensor data;
reading left yaw rate and left acceleration from the fourth sensor data;
reading right yaw rate and right acceleration from the fifth sensor data; and
calculating a sensor yaw misalignment and sensor offsets from a vehicle control point based on the vehicle speed, left yaw rate, left acceleration, right yaw rate, and right acceleration.

* * * * *